United States Patent
Nakatani et al.

(10) Patent No.: US 7,110,249 B2
(45) Date of Patent: Sep. 19, 2006

(54) ELECTRONIC APPARATUS

(75) Inventors: Masato Nakatani, Kawaguchi (JP); Osamu Kondo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/946,364

(22) Filed: Sep. 22, 2004

(65) Prior Publication Data

US 2005/0063150 A1    Mar. 24, 2005

(30) Foreign Application Priority Data

Sep. 24, 2003    (JP) .............................. 2003-332144

(51) Int. Cl.
*H05K 5/00*    (2006.01)
*H04R 9/06*    (2006.01)
*H04R 25/00*    (2006.01)

(52) U.S. Cl. ..................... 361/683; 361/679; 361/681; 381/333; 381/383

(58) Field of Classification Search ................ 353/112, 353/119, 120; 181/148, 150, 199, 160; 381/333, 381/345, 388, 88, 89, 90, 303–307, 309, 381/87, 386, 301, 334, 387, 383; 248/917; 645/169, 905; 312/223.1–223.6; 361/679–687
See application file for complete search history.

(56) References Cited

U.S. PATENT DOCUMENTS

| | | | | |
|---|---|---|---|---|
| 5,323,291 A | * | 6/1994 | Boyle et al. | 361/686 |
| 5,347,425 A | * | 9/1994 | Herron et al. | 361/686 |
| 5,668,882 A | * | 9/1997 | Hickman et al. | 381/300 |
| 5,682,290 A | * | 10/1997 | Markow et al. | 361/683 |
| 5,917,695 A | * | 6/1999 | Youn | 361/683 |
| RE36,381 E | * | 11/1999 | Boyle et al. | 361/686 |
| 6,067,224 A | * | 5/2000 | Nobuchi | 361/683 |
| 6,078,497 A | * | 6/2000 | Derocher et al. | 361/683 |
| 6,175,489 B1 | * | 1/2001 | Markow et al. | 361/683 |
| 6,175,493 B1 | * | 1/2001 | Gold | 361/687 |
| 6,181,550 B1 | * | 1/2001 | Kim | 361/683 |
| 6,246,570 B1 | * | 6/2001 | Kim | 361/683 |
| 6,256,192 B1 | * | 7/2001 | Shannon | 361/683 |
| 6,262,824 B1 | * | 7/2001 | Sasaki et al. | 398/115 |

(Continued)

FOREIGN PATENT DOCUMENTS

JP    07-131849    5/1995

(Continued)

OTHER PUBLICATIONS

Chinese Office Action dated Dec. 30, 2005 for Appln. No. 200410079153.6.

*Primary Examiner*—Lisa Lea-Edmonds
*Assistant Examiner*—Zachary Pape
(74) *Attorney, Agent, or Firm*—Pillsbury Winthrop Shaw Pittman, LLP

(57) ABSTRACT

An electronic apparatus has a first housing, a second housing, and speakers. The first housing and second housing are so coupled as to be movable between a first position away from each other and a second position in which one of them is laid on the other. The speaker is provided in the first housing. A first opening is situated at a place covered over the second housing when it is in the second position and corresponding to the speaker. A second opening is located on the second housing at a place corresponding to the first opening when the second housing is in the second position. A third opening is provided in the second housing situated on the outer side at the second position and communicates with the second opening.

8 Claims, 4 Drawing Sheets

U.S. PATENT DOCUMENTS

| | | | |
|---|---|---|---|
| 6,292,358 B1* | 9/2001 | Lee et al. | 361/683 |
| 6,304,434 B1* | 10/2001 | Markow | 361/683 |
| 6,324,052 B1* | 11/2001 | Azima et al. | 361/683 |
| 6,359,994 B1* | 3/2002 | Markow et al. | 381/333 |
| 6,392,871 B1* | 5/2002 | Yanase | 361/681 |
| 6,498,721 B1* | 12/2002 | Kim | 361/681 |
| 6,744,623 B1* | 6/2004 | Numano et al. | 361/681 |
| 6,781,823 B1* | 8/2004 | Nyack | 361/683 |
| 6,792,126 B1* | 9/2004 | Okuno et al. | 381/412 |
| 2001/0030850 A1* | 10/2001 | Ditzik | 361/683 |
| 2002/0018574 A1* | 2/2002 | Okuno et al. | 381/333 |
| 2003/0052857 A1* | 3/2003 | Pappas | 345/156 |
| 2003/0095380 A1* | 5/2003 | Chen et al. | 361/686 |
| 2004/0027793 A1* | 2/2004 | Haraguchi et al. | 361/683 |
| 2004/0207978 A1* | 10/2004 | Ueda et al. | 361/683 |
| 2005/0018396 A1* | 1/2005 | Nakajima et al. | 361/683 |
| 2005/0041390 A1* | 2/2005 | Huang | 361/687 |
| 2005/0063150 A1* | 3/2005 | Nakatani et al. | 361/683 |
| 2005/0068719 A1* | 3/2005 | Kusamoto et al. | 361/683 |

FOREIGN PATENT DOCUMENTS

| | | |
|---|---|---|
| JP | 10-078831 | 3/1998 |
| JP | 2001-100862 | 4/2001 |
| JP | 2002-182784 | 6/2002 |

* cited by examiner

ELECTRONIC APPARATUS

CROSS-REFERENCE TO RELATED APPLICATIONS

This application is based upon and claims the benefit of priority from the prior Japanese Patent Application No. 2003-332144, filed Sep. 24, 2003, the entire contents of which are incorporated herein by reference.

BACKGROUND OF THE INVENTION

1. Field of the Invention

The present invention relates to an electronic apparatus, such as a portable computer, having a speaker in its body to allow the user to enjoy a TV sound and a played-back sound from a compact disk.

2. Description of the Related Art

An electronic apparatus, such as a portable computer, equipped with a speaker in its body has been popularized and it allows the user to enjoy a TV sound and a played-back sound from the data of a compact disk. The portable computer comprises a body having a keyboard and a display panel having an LCD unit. The speaker is built in a somewhat upper portion of the body. The body and LCD (Liquid Crystal Display) unit are coupled to each other by hinges to provide a foldable unit. The portable computer is convenient to carry, wholly thinner in thickness and lighter in weight. Various kinds of electronic components within the body are closely arranged and the speaker is arranged at a limited space.

For example, JPN PAT APPLN KOKAI PUBLICATION NO. 10-78831 discloses a portable computer in which a speaker is arranged in the inner side of a hinge section by which a display panel is foldably coupled to a body and a sound output hole is provided in a cover with which the speaker is covered.

JPN PAT APPLN KOKAI PUBLICATION No. 2001-100862 discloses a portable computer in which a continuous opening from the upper surface to a side surface of the body is provided in an offset position at the right and left end side portions of the upper surface of a body in the vicinity of a corresponding hinge and a speaker outputs sound from the upper and side portions of the opening.

Further, JPN PAT APPLN KOKAI PUBLICATION No. 2002-182784 discloses a portable computer in which a speaker is provided in an inner portion of a top cover which covers a hinge portion of a body. Many speaker holes are provided in a circular arc surface of the top cover. Sound is output past the speaker holes.

Even in any portable computer disclosed in these KOKAI PUBLICATIONs, the body and display panel are foldably coupled together by the hinges. The sound output section in any case is exposed with the display panel opened or closed relative to the body. The user can enjoy a TV sound, or a played-back sound from the sound data of the compact disk, on these portable computers.

According to JPN PAT APPLN KOKAI PUBLICATION No. 10-78831, a speaker is provided in the inner side of a hinge section. If, in this case, an area of a sound output section is made greater, then a hinge portion is greater. If the hinge portion becomes greater, then a cutout in the display panel becomes greater so as to prevent any hinge portion. As a result, the LCD unit is arranged away from the hinge portion.

According to JPN PAT APPLN KOKAI PUBLICATION No. 2001-100862, the speaker is so arranged as to generate sound from upper and side surface sides of the body. However, with the display panel closed, the top surface is covered with the display panel and sound is output from the side portion only and no adequate sound effect is ensured with the display panel closed.

According to JPN PAT APPLN KOKAI PUBLICATION No. 2002-182784, the speaker is provided in the inner portion of the top cover with which a hinge portion of the body is covered. As a result, the top cover is greater in size. Since the top cover is expose with the display panel closed in particular, the body and display panel become greater, thus presenting a problem.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
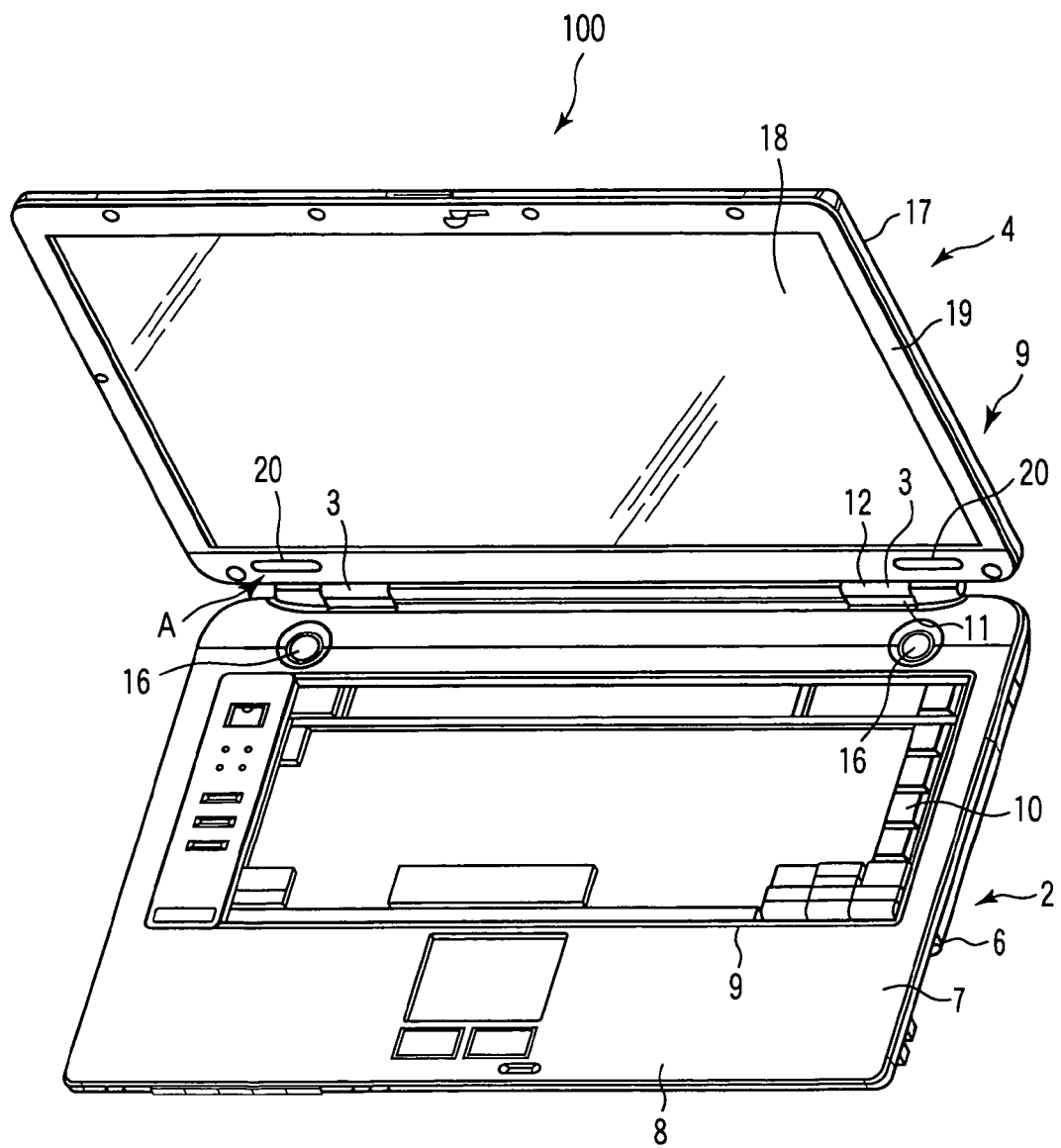
FIG. 1 is a perspective view showing a portable computer of a first embodiment according to the present invention with a display panel opened at a first position.
Figure 2:
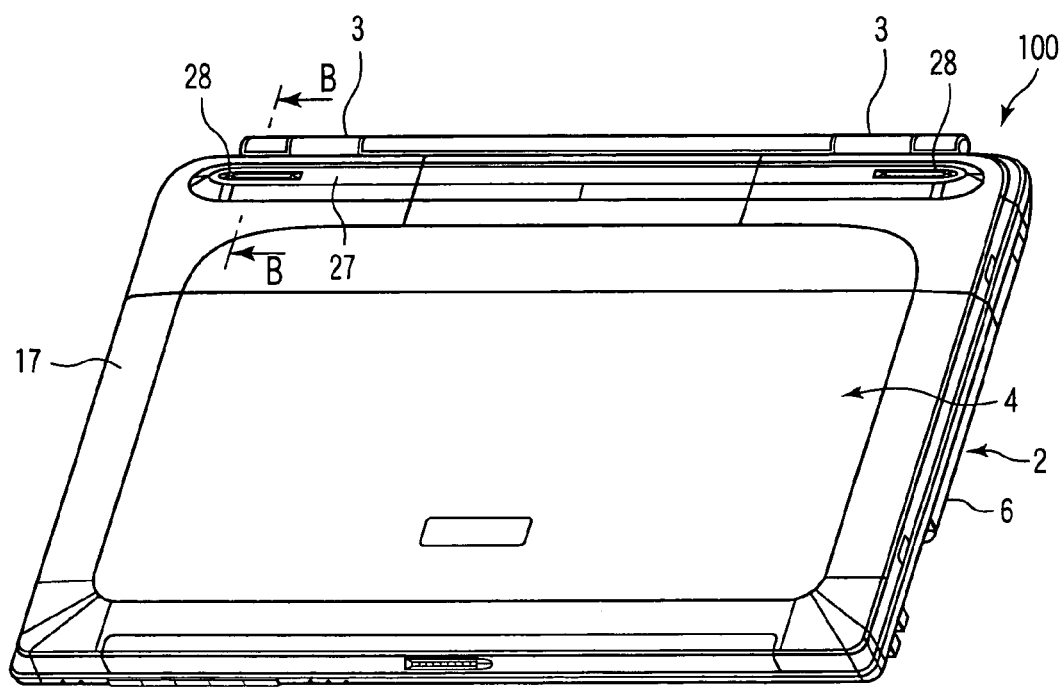
FIG. 2 is a perspective view showing a second position with a display panel of the portable computer of FIG. 1 closed.

With reference to FIGS. 1 to 4, for example, a portable computer 100 will be explained below as an electronic apparatus according to a first embodiment of the present invention. As shown in FIGS. 1 and 2, the portable computer 100 has a body 2 as a first housing or body casing, a display panel 4 as a second housing and a speaker 13.

The body 2 has a housing 5 and a keyboard 10. The housing 5 is formed into a flat boxy shape and divided into a lower housing 6 and an upper housing 7. The lower housing 6 is formed into a rectangular plate-like shape. The upper housing 7 is formed into a plate-like shape and so configured as to cover the lower housing 6 from above. A palm-rest 8 and keyboard mounting section 9 are positioned on the top surface of the upper housing 7. The keyboard 10 is attached to the keyboard mounting section 9.

The display panel 4 has a cover 17, an LCD unit 18 and an outer frame 19. The LCD unit 18 constitutes one example of a display image screen and has a display screen for displaying information, etc., and a non-display surface on a side opposite to that of the display screen. The cover 17 is so configured as to cover the non-display side of the LCD unit 18. The outer frame 19 covers an outer marginal edge of the display screen side of the LCD unit 18.

The display panel 4 is rotatably coupled to the body 2 by hinges 3. The hinges 3 are provided with a pair one on the right side and one on the left side of the body. The hinge 3 has an upper hinge member and a lower hinge member 12 which are so coupled as to be rotatable about a hinge shaft 11. The lower hinge member is fixed to the lower housing 6. The upper hinge member 12 is fixed to the display panel 4. The display panel 4 is rotatable, relative to the body 2, between an open state (first position) as shown in FIG. 1 and a closed state (second position) as shown in FIG. 2.

Figure 3:
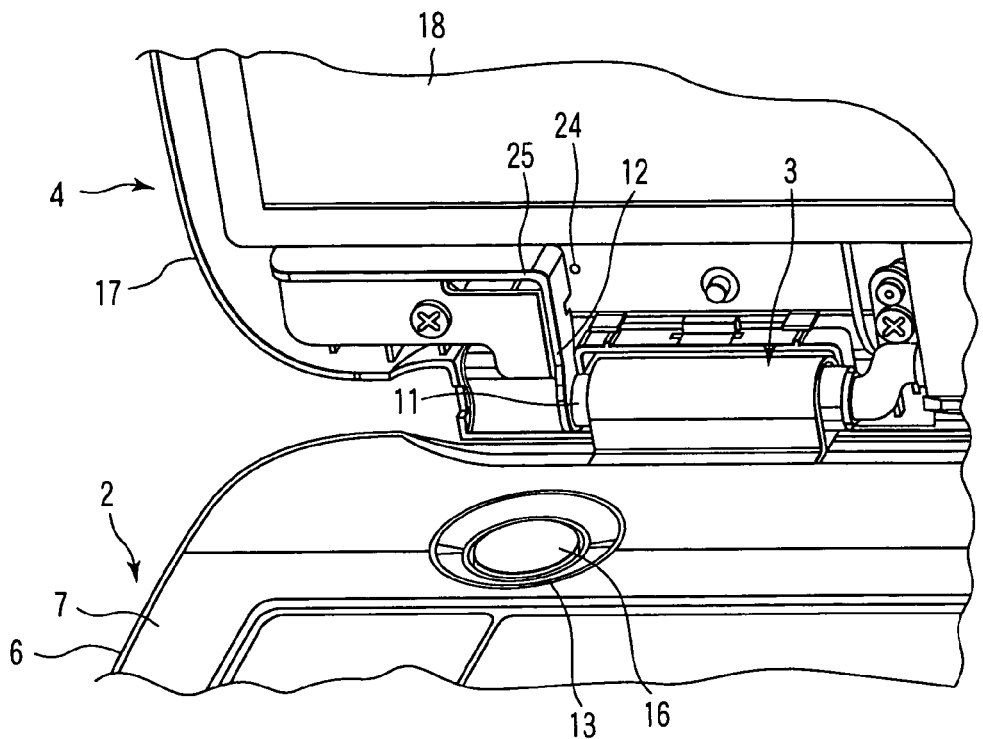
FIG. 3 is an enlarged, perspective view showing at an A portion of the portable computer shown in FIG. 1 in condition that an outer frame is removed.
Figure 4:
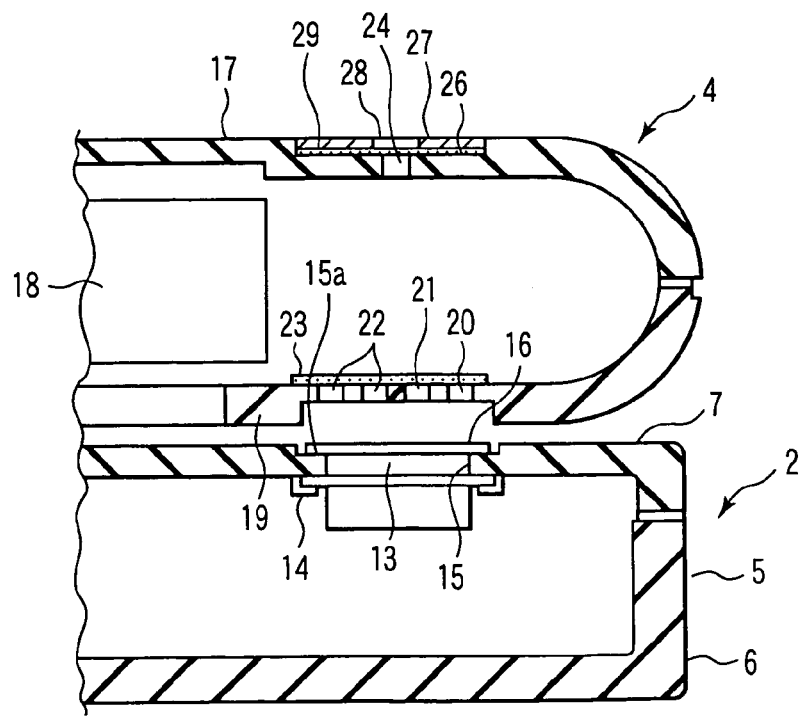
FIG. 4 is a cross-sectional view along a line B—B of the portable computer shown in FIG. 2.

The speakers 13 are symmetrically positioned, as shown in FIG. 1, near the right and left ends of the body 2. The speaker 13 is located on the lower side of the upper housing 7 in the vicinity of the corresponding hinge 3 and, as shown in FIGS. 3 and 4, fixed through a bracket 14 to allow sound to be generated upward from inside the housing 5. Although, in the present embodiment, the speaker 13 is shown as being fixed to the bottom surface of the upper housing 7, it may be fixed to the lower housing 6.

The upper housing 7 has a circular through hole 15 as a first opening at a place where it is aligned with a sound generating section of the speaker 13. The through hole 15 has a stepped section 15a evenly recessed from the outer surface of the upper housing 7. A net 16 covering the through hole 15 is fixed to the stepped section 15a by means of an adhesive for example.

The outer frame 19 has a sound inlet 20 as a second opening at a hinge-side place corresponding to the through hole 15 with the display panel 4 closed. The sound inlet 20 consists of many small holes 22 in a thinner portion 21 which is longer along a hinge shaft 11. A felt sheet 23 is bonded to the inner surface of the sound inlet 20 to cover the respective small holes 22. The felt sheet 23 prevents the intrusion of dust into the inside of the display panel 4 via the sound inlet 20 and also prevents an eye observation of its inside.

The cover 17 has a sound outlet 24 as a third opening at a place corresponding to the sound inlet 20. The sound outlet 24 is formed, for example, as a single hole and located in a position away from a reinforced rib 25 of the upper hinge member 12. The sound outlet 24 is opened in a stepped section 26 more laterally recessed from an outer surface of the cover 17. A decorated member 27 is fitted in the stepped section 26 and in a way flush with the outer surface of the cover 17. The decorated member 27 has an opening window 28 opened at a place corresponding to the sound outlet 24. A felt sheet 29 covering the sound outlet 24 is fitted between the decorated member 27 and the stepped section 26. The felt sheet 29 prevents the intrusion of dust into the display panel 4 via the sound outlet 24 and also prevents the eye observation of an inside of the cover.

According to the portable computer 100 thus structured, with the panel 4 opened relative to the body 2 (first position), the net 16 is seen as shown in FIGS. 1 and 3. In the first position, the user, while watching an TV image on the LCD unit 18, can enjoy a TV sound which is output from the speaker 13 past the through hole 15.

With the display panel 4 closed relative to the body 2 (second position), the through hole 15, sound inlet 20 and sound outlet 24 are oriented in a straight line. Even in the second position, since sound is output from the speaker 13 past the through hole 15, sound inlet 20 and sound outlet 24, the user can enjoy a played-back sound from sound data stored in a compact disk, etc.

The sound inlet 20 and sound outlet 24 are formed in a dead space of the display panel 4. Since there is no obstacle on a way from the through hole 15 to the sound outlet 24, a sound output from the speaker 13 is not reflected on any obstacle. Therefore, the user can enjoy a good-quality speaker sound. The outer appearance of the portable computer 100 is better from a view point of a design because the small opening window 28 is simply seen at the decorated member 27 provided on the outer surface of the cover 17 without any net, etc., being exposed.

Although, in the first embodiment, an explanation will be made, for example, about the portable computer 100 of such a foldable type as to couple the display panel 4 by the hinges 3 to the body 2, the present invention is not restricted to the portable computer 100 and it can be applied to any electronic apparatus of such a type as to foldably couple any two housings to each other with a speaker provided in one of these housings.

Figure 5:
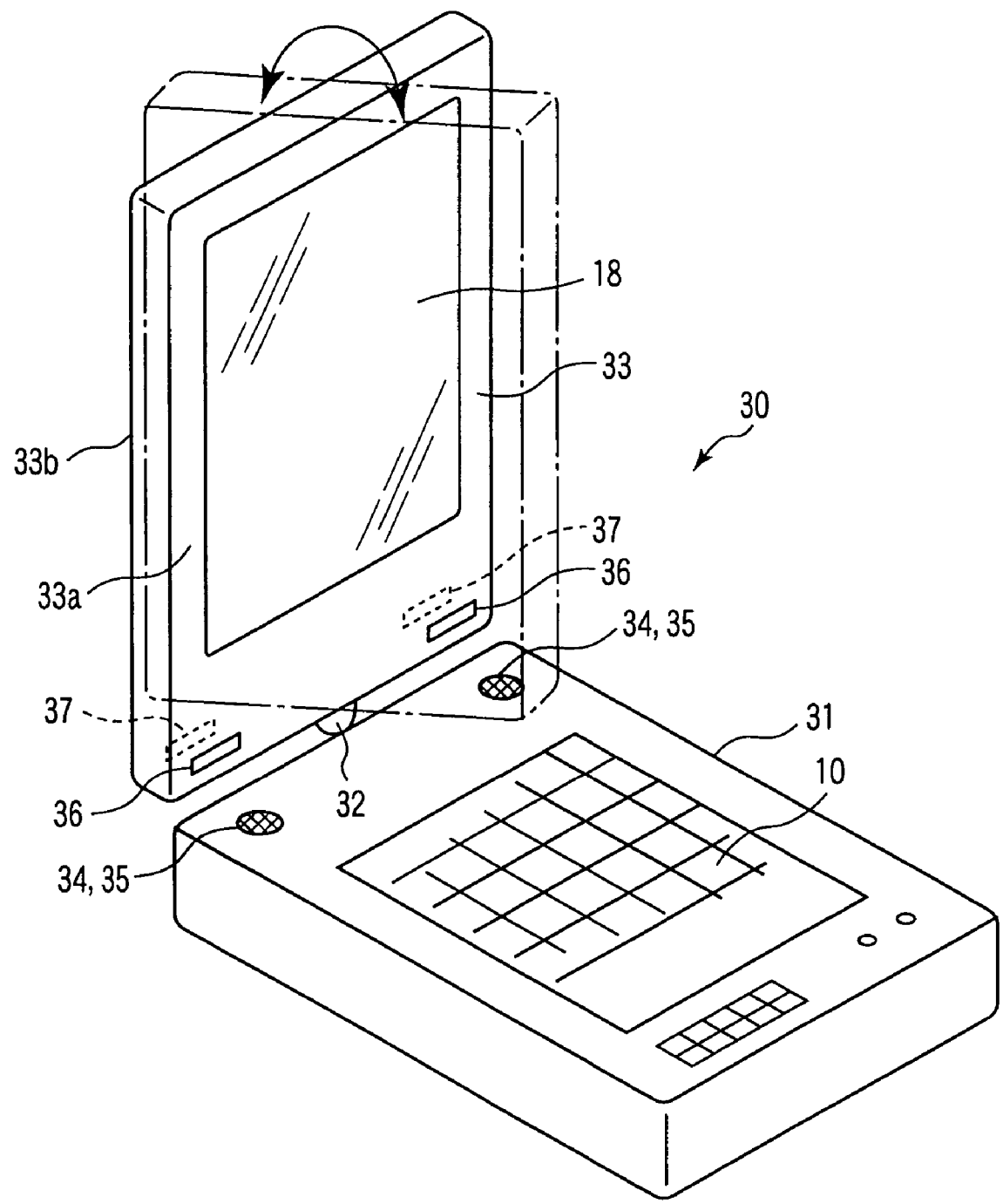
FIG. 5 is a perspective view showing an electronic apparatus of a second embodiment according to the present invention.

Now with reference to FIG. 5, an explanation will be made below about an electronic apparatus 30 according to a second embodiment of the present invention. The components that have same functions as the portable computer 100 according to the first embodiment will respectively applying the same reference symbols and may omit the description from followings. The electronic apparatus 30 has a body casing 31 as a first housing, a display panel 33 as a second housing, and speakers 34. The body casing 31 and display panel 33 are formed a flat rectangular box with a reversing hinge 32 coupled at one edge portion at a mid-area in a width direction. The reverse-turning hinge 32 is one example of a swivel section for allowing the display panel 33 to be reverse turned relative to the body casing 31.

In use, the electronic apparatus 30 can be hingeably turned to a opened state (first position) in which the display panel 33 is set erect relative to the body case 31, a closed state (second position) in which the display panel 33 is laid on the body casing 31, facing a display surface 33a side to the body casing 31, and a reversed stat (third position) in which the display panel 33 is laid on the body casing 31 facing a non-displaying surface 33b side to the body casing 31.

The thus structured electronic apparatus 30, like the portable computer 100 of the first embodiment, is equipped with the speakers 34 at a right/left symmetrical relation with the reversing hinge 32 as a center. A through hole 35 as a first opening is provided at the top surface side of the body casing 31 at those places corresponding to the speakers 34. Sound inlets 36 as second openings and sound outlets 37 as third openings are provided in the display panel 33 at both right/left portions symmetrically relating with the reversing hinge 32 as a center.

According to the thus structured electronic apparatus 30, the through hole 35, sound inlet 36 and sound outlet 37 are aligned on a straight line at any second or third position. Since no obstacle is present on a way from the through hole 35 to the sound outlet 37, any sound from the speaker 34 can be output to an outside of the electronic apparatus 30 without being reflected on any obstacle. Therefore, the user can enjoy a good-quality sound from the speakers.

The portable computer with the body and display panel foldably coupled to each other by the hinge has been explained in connection with the first embodiment. The electronic apparatus with the body casing and display panel reversibly jointed together by the reversing hinge has been explained in connection with the second embodiment. The present invention is not restricted to the above-mentioned two examples and can also be applied to an electronic apparatus in which both housings having a built in system circuit board, etc., but not having any display image screen are coupled together by a hinge or pivotal means so that they can be opened/closed or reverse-turned.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   body having a keyboard positioned on a top surface thereof;
   a display panel including a display image screen, said display panel is coupled to the body and configured to be movable between a first position in which the display panel is spaced away from the body and a second position in which the display panel is laid on the body;
   a speaker provided in the body;
   a first opening provided in the body at a place covered by the display panel when the display panel is in the second position for a sound to be output from the speaker;
   a second opening provided in a first surface of the display panel at a place facing the body when the display panel is in the second position;
   a third opening provided in a second surface of the display panel at the second position and communicating with the second opening; and
   a hinge configured to rotate the display panel from the second position to the first position relative to the body, wherein, when the display panel is in the first position, sound from the speaker is output from the first opening and, when the display panel is in the second position, the sound from the speaker is output from the third opening past the first and second openings.

2. An electronic apparatus according to claim 1, wherein the hinge is a reversing hinge configured to rotate the display panel relative to the body from the second position to the first position and turn the display panel to a third position in which the display panel is laid on the body in a manner to set a second surface side opposite to said first surface side oriented to the body; and
   wherein, the third opening is located in a position facing the first opening when the display panel is in the third position; and
   when the display panel is in the third position, the sound from the speaker is output from the second opening past the first opening and third opening.

3. An electronic apparatus according to claim 2, wherein the speaker and first opening are each located in a pair in a symmetrical relation from the reversing hinge.

4. An electronic apparatus according to claim 2, wherein the second opening and third opening are each located in a pair in a symmetrical relation from the reversing hinge.

5. An electronic apparatus according to claim 2, wherein the second opening and third opening are mutually located in a rotationally symmetric relation about the reversing hinge.

6. An electronic apparatus according to claim 2, wherein the speaker is located at an edge portion of the body at a place away from the reversing hinge.

7. An electronic apparatus according to claim 1, wherein the first opening, second opening and third opening are aligned in a direction in which the display panel is laid on the body when the display panel is in the second position.

8. An electronic apparatus according to claim 1, wherein the speaker is fixed near the hinge.

* * * * *